United States Patent [19]
Johnson

[11] Patent Number: 5,295,455
[45] Date of Patent: Mar. 22, 1994

[54] BIRD EXCLUDING TECHNIQUE

[75] Inventor: Ron J. Johnson, Lincoln, Nebr.

[73] Assignee: The Board of Regents of the University of Nebraska, Lincoln, Nebr.

[21] Appl. No.: 984,203

[22] Filed: Nov. 30, 1992

[51] Int. Cl.$^5$ .............................................. A01K 39/00
[52] U.S. Cl. .................................. 119/57.9; 119/52.3
[58] Field of Search ............... 119/57.9, 52.3, 52.4, 119/903, 25, 23, 49, 50, 174, 52.2, 57.8;

[56] References Cited

U.S. PATENT DOCUMENTS

| | | | |
|---|---|---|---|
| 1,894,406 | 1/1933 | Lenhart | 119/23 |
| 2,797,662 | 7/1957 | Adams | 119/52.4 |
| 2,890,681 | 6/1959 | Sack | 119/52.4 |
| 2,933,062 | 4/1960 | Geerlings | 119/52.4 |
| 2,974,634 | 3/1961 | Williams et al. | 119/52.4 |
| 3,049,093 | 8/1962 | Oliver | 119/23 |
| 3,090,354 | 5/1963 | Merritt et al. | 119/52.4 |

Primary Examiner—Gene Mancene
Assistant Examiner—Thomas Price
Attorney, Agent, or Firm—Vincent L. Carney

[57] ABSTRACT

To provide access to a bird feeder to desirable species while excluding House Sparrows (*Passer domesticus*), a loop is mounted above the feeder and extends outwardly a few inches. The excluder is fastened to the bird feeder by staples or adhesives.

14 Claims, 1 Drawing Sheet

BIRD EXCLUDING TECHNIQUE

BACKGROUND OF THE INVENTION

This invention relates to techniques and apparatus for selectively excluding certain birds from a feeder while permitting other species to utilize the feeder.

There are prior art apparatuses which permit certain birds to use a feeder while others are excluded. One prior art type of such feeder utilizes selective size holes or the like to exclude larger birds. This prior art type of excluder has the disadvantage of admitting all small birds and excluding all large birds rather than admitting some species and excluding other species, although it is often desirable to permit a species to utilize the feeder without regard to size while excluding others, such as for example excluding full grown adults while permitting young immature House Sparrows to use the feeder.

It is also known from published studies that some species of birds will not fly under elongated wires. This technique has been utilized over fruit fields to exclude certain birds from feeding on the fruit.

These prior art excluders have not been applied to feeders, nor has a practical embodiment been developed useful for small backyard feeders to selectively permit certain species to use the feeders while excluding others, such as for example House Sparrows (*Passer domesticus*).

SUMMARY OF THE INVENTION

Accordingly, it is an object of the invention to provide a novel technique and apparatus for selectively permitting certain species of birds to use a feeder while excluding others.

It is a further object of the invention to provide a compact and efficient feeder.

It is a still further object of the invention to provide a bird excluding technique which discriminates between birds in an efficient and practical manner.

In accordance with the above and further objects of the invention, a bird feeder includes a compartment containing food, an opening or openings through which birds gain access to the food and an elongated selective bird-excluding member. The elongated selective bird-excluding member is preferably a filiment or wire-like member formed in closed or substantially closed outline of a geometric configuration such as a circle or a square having at least a portion extending over the openings of the feeding compartment or a section of a geometric figure over the opening and being mounted adjacent to the openings and extending only a short distance from the feeding compartment. The elongated selective bird-excluding member is mounted directly to the feeder in most embodiments and is located slightly above the bird-access opening or openings.

Advantageously, lines may be extended from the elongated selective bird-excluding member or from a location near the elongated selective bird-excluding member to the ground to prevent undesirable species of birds such as House Sparrows (*Passer domesticus*) from feeding on the ground. However, the filaments extending from the feeder to the ground may be omitted to permit species excluded from the feeder to feed on the ground while causing them to refrain from taking feed out of the feeder.

With this arrangement, excluded species of birds such as House Sparrows (*Passer domesticus*) will not take food from the compartment through the access opening or openings whereas other birds such as cardinals or the like will take such food.

The elongated selective bird-excluding member may be preformed for easy mounting to a feeder such as by molding it of plastic or machine bending it of wire or stamping it from metal or other sheet material, or in the alternative, may be integrally formed as part of the feeder. Separately formed elongated selective bird-excluding members may be mounted to the feeder or other structure near the feeder by staples or nails or adhesive fabric. In either case, the elongated selective bird-excluding member may be formed as a circle with one or more segments or diameters and the segments or diameters may rest upon or be fastened to or integrally formed with the roof of a feeder with the elongated member extending slightly beyond the sides to be at a higher level then openings in the feeding compartment.

The elongated member may be wire formed as a closed loop or as a 70% or more closed loop or a section over the openings. The loop may be square or circular or triangular or any other configuration that would provide the overhanging wire. The overhanging wire need not be positioned to physically prevent birds from entering from the top and can permit access from the sides.

The ground excluder need only include four or five elongated members dropped downwardly to a location on the ground or near the ground. It is not important for there to be so many as to physically exclude birds since House Sparrows (*Passer domesticus*) will not enter, whereas other types of desirable species will enter and thus can feed off of the ground underneath the feeder for bird feed that may have dropped out of the feeder.

From the above description, it can be understood that the feeder of this invention has several advantages, such as: (1) it selectively permits birds to use the feeder on a basis other than size of the bird; (2) it is economical to make and assemble; and (3) it is not unsightly nor expensive.

SUMMARY OF THE DRAWINGS

The above noted and other features of the invention will be better understood from the following detailed description when considered with reference to the accompanying drawings, in which.

DETAILED DESCRIPTION

Figure 1:
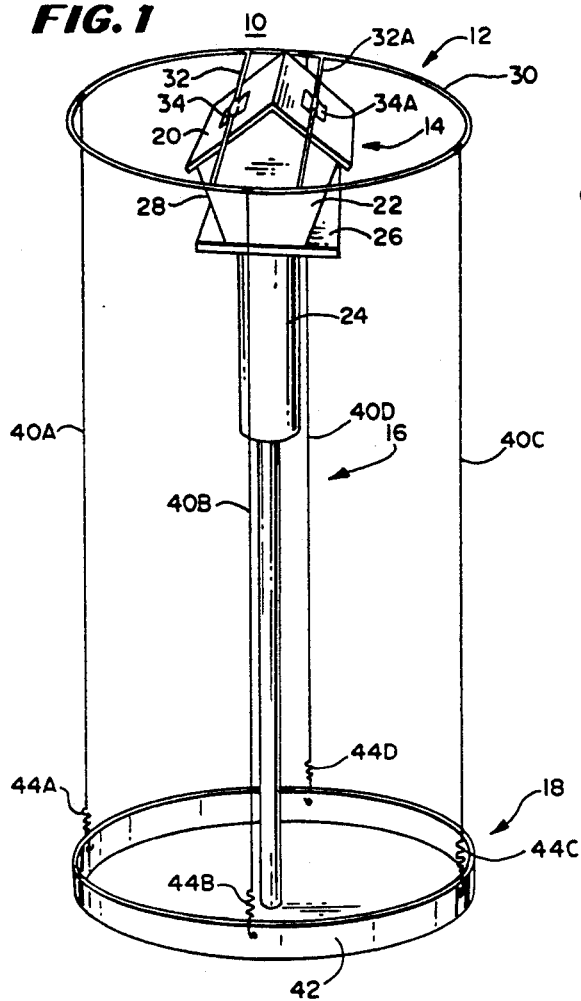
FIG. 1 is a perspective view of one embodiment of bird feeder and bird excluder.

In FIG. 1, there is shown a combination bird feeder and bird excluder 10 having an elongated, selective bird-excluding member 12, a feeder compartment 14, a feeder compartment support 16 and a ground excluder 18. The elongated, selective bird-excluding member 12 is mounted to the feeder compartment 14 and rests on top of it extending slightly beyond bird access openings 28 in the feeder compartment 14. The elongated selective bird-excluding member 12 is supported by the feeder compartment 14 which, in turn, is supported by the feeder compartment support 16 so as to be above ground and the ground excluder 18 is mounted to or adjacent to the elongated selective bird-excluding member 12 and drops downwardly to the ground. In the alternative, the feeder compartment support 16 may be a flexible cord or the like supporting the feeder compartment 14 from an overhanging branch of a tree or the like.

Figure 2:
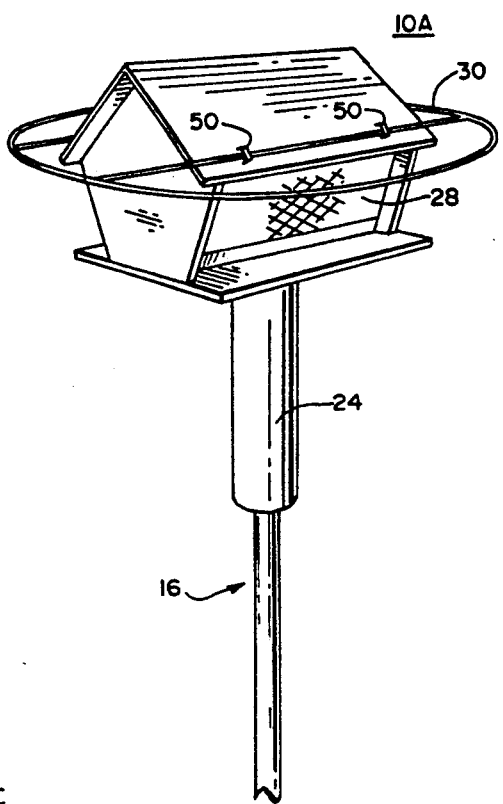
FIG. 2 is a fragmentary perspective view of another embodiment of bird feeder and bird excluder.

The feeder compartment 14 includes roof members 20, side members 22, a squirrel guard 24, a bird ledge 26 and feeder openings 28 (the feeder openings being more clearly shown in FIG. 2). The walls 22 may be of any convenient shape to form an enclosure having openings 28 in it for access to the feed by birds. Preferably, they rise from the bird ledge 26 which may support the birds while they feed and is covered by roof members 20 to keep the weather away from the feed. Advantageously, an enlarged squirrel excluder 24 extends from the support 16 between the support 16 and the feeder to provide an enlarged barrier to squirrels to keep them from climbing from the ground to the feeder. The post may be any type of support mounted at a lower elevation to hold the compartment above ground or mounted outwardly from a wall of a building or upwardly or downwardly from an elevated member.

To selectively exclude certain species of birds such as House Sparrows (*Passer domesticus*) while not preventing others from using the feeder, the elongated, selective bird-excluding member 12 includes one or more principal elongated excluding members 30, one or more support members such as 32 and 32A and one or more fasteners 34 and 34A, although in some combinations of feeders and excluders, the fasteners may be ommitted with the excluder being supported by its own weight on a feeder. The principal elongated excluding member or members 30 should form a closed or substantially closed outline of a geometric figure such as a circle or square or triangle or section of geometric figure over the openings.

In FIG. 1, a single elongated member 30 forms a closed circle slightly larger than the feeder and is above and extending beyond the feeder access openings in the feeder compartment 14. The elongated principal excluding member 30 should have a thickness of between 1/32 and two inches and should extend a distance beyond the opening of between two inches and two feet to provide a deterant to House Sparrows (*Passer domesticus*) and yet not be excessively heavy.

In the embodiment of FIG. 1, the support members 32 and 32A are elongated members extending across the circle formed by the elongated excluding member 30 and positioned so that they can rest on the roof 20 of the feeder compartment 14. The fasteners 34 and 34A are tape or other members that fit over the support members 32 and 32A respectively to hold the support members to the roof 20 of the feeder compartment 14. Obviously, staples or nails or any other type of fastening means may be used and, in some embodiments, the support members themselves may hold the bird excluder in place with sufficient firmness.

The enlongated excluding member 30 and the supports 32 and 32A may be wire such as that commonly formed of metal or may be elongated plastic members or the like. The excluder should be positioned above the feeder openings within a distance of slightly below the top of the opening to a heighth of two feet above the openings. Slightly below the top of the opening is, for example, 10 percent of the height of the opening below the top of the opening.

To exclude birds, such as House Sparrows (*Passer domesticus*), from feeding underneath the feeder if the feeder is raised to a high elevation or if the excluder is positioned a sufficient height above the feeder openings to not deter House Sparrows (*Passer domesticus*) from flying under it at the level of the ground, a ground excluder 18 may be utilized. The ground excluder 18 are filaments that drop down to the ground underneath the feeder and may be conveniently flexible wire-like members 40A–40D fastened to the excluder at a top end and dropping downwardly to the ground. To hold the filaments 40A–40D downwardly, they may be each fastened at a different location to one or more weighted members 42 by one or more springs, such as 44A–44D. There should be at least four such lines extending downwardly in the case of a post or corresponding smaller number if there is a blocking wall or the like on one side. More may be used without impeding the effectiveness but wide open spaces may be permitted and the birds of the selected species will freely feed underneath the feeder regardless of the lines.

In FIG. 2, there is shown a fragmentary perspective view of another embodiment of feeder and excluder 10A substantially the same as that of FIG. but more clearly showing the openings 28 (FIG. 1) in the feeder compartment 14. Corresponding parts of the feeder and excluder 10A have reference numerals that correspond to the reference numerals of identical parts in FIG. 1. However, in FIG. 2, the excluder is fastened by staples 50 rather than by adhesive.

Figure 3:
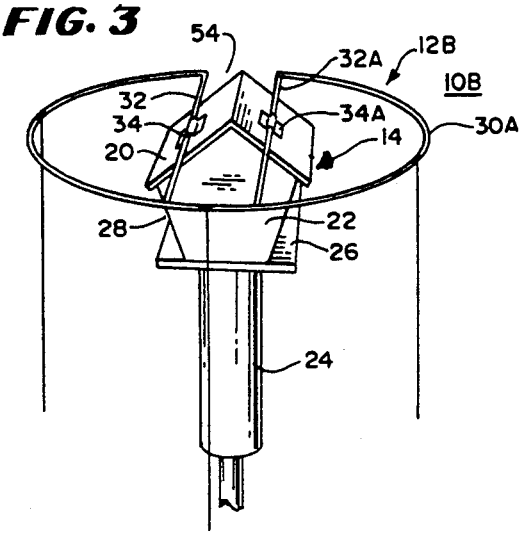
FIG. 3 is a perspective view of still another embodiment of bird feeder and bird excluder.

In FIG. 3, there is shown still another embodiment 10B again with parts identical to those in FIG. 1 bearing corresponding reference numeral. However, the excluder 12B in FIG. 3 includes an open section 54 so that the elongated excluding member 30A is not closed but is at least 70% closed or at least 252 degrees continuous arc. However, a smaller section positioned over the openings may be used.

Figure 4:
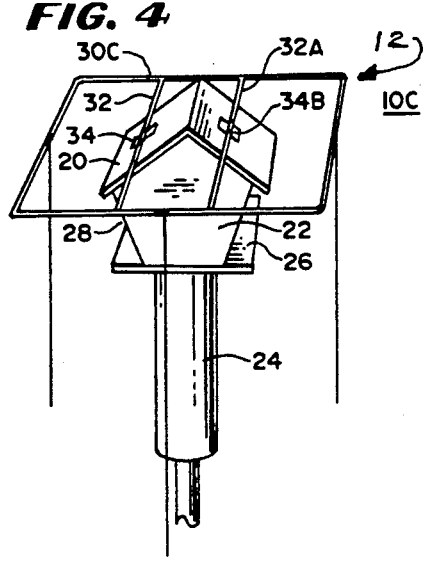
FIG. 4 is still another embodiment of bird feeder and bird excluder.

In FIG. 4, there is shown still another embodiment 1OC in which corresponding members have corresponding numerals but in which the enclosed member 30C has a shape other than a circle such as a square. Of course many other configurations may be formed in accordance with the above teachings. They may be geometric configurations or have different amounts of openings or differently-shaped support members such as curved support members or the like and different fasteners.

To utilize the bird excluder, conventional feeders may be obtained with feeding compartments of any shape without regard to structures such as slanted roof members or flat roof members or location of openings or the like. The feeder is mounted in the normal manner whether to the ground or to a building and whether dropped downwardly from an upper support such as the branch of a tree or supported from the ground by a post.

The elongated selective bird-excluding member 12 may be stamped out of plastic or formed by injection molding or bent from wire or the like. The support members 32 and 32A may be integrally formed or may be fastened to the elongated excluding member forming an outline. Moreover, the excluder may be formed as part of the feeder such as a roof with a flat top having stamped out of it the integrally formed support members with the elongated member stamped as a circle or a square or the like at the ends of the support members and that may be mounted to the walls to form the feeder.

In the case where the excluder is formed separately, it may be carried to the feeder and rest on the roof and be fastened by tape or the like. Birds that are repelled from feeders by this structure and procedure include House Sparrows (*Passer domesticus*). Birds that are not repelled include blue jays, northern cardinals, American goldfinches, common grackles, black-capped chickadees, mourning doves, Harris' sparrows, dark-eyed juncos, American tree sparrows, European starlings, brown-headed cowbirds, Downing woodpeckers and red-bellied wookpeckers. From the above description, it can be understood that the bird excluder of this invention has several advantages, such as: (1) it selectively excludes undesirable types of birds such as House Sparrows (*Passer domesticus*) while permitting desirable birds such as northern cardinals or the like to feed; (2) it may be economically formed; (3) existing feeders may be easily retrofitted with the excluder; and (4) it may be easily adapted to exclude birds from the feeder but not from the ground under the feeder or both from the feeder and the ground under the feeder.

Although a preferred embodiment of the invention has been described with some particularity, many modifications and variations of the preferred embodiment may be made without deviating from the invention. Accordingly, it is to be understood that, within the scope of the appended claims, the invention may be practiced other than as specifically described.

What is claimed is:

1. The combination of a bird feeder and bird excluder comprising:
    a bird feeder compartment;
    a support means for supporting the bird feeder compartment above ground;
    the bird feeder compartment including side members, roof members and at least one access opening for access to feed therein by birds;
    said access opening having a top and a bottom and an access-opening height between the top and the bottom;
    an excluder means for physically permitting certain species of birds to enter from the top and from the sides while causing other species not to enter mounted at a location to be within a distance extending from below the top of the at least one access opening a distance of 10 percent of the access-opening height to two feet above the top of the access opening of the feeder;
    said excluder having at least one thin elongated member extending beyond the at least one access opening at an elevation at least five inches from the bottom of the at least one access opening;
    said at least one thin elongated member overhanging said at least one access opening and being spaced to physically permit birds to enter and take food.

2. The combination of a bird feeder and bird excluder in accordance with claim 1 in which the excluder means is formed only of elongated members having a diameter of between 1/32 of an inch and two inches.

3. The combination of a bird feeder and bird excluder in accordance with claim 2 in which the excluder includes means for mounting it to at least one of the roof members of the bird feeder.

4. The combination of a bird feeder and bird excluder in accordance with claim 1 in which said excluder means includes one thin elongated member formed as a geometric figure substantially closed and at least one diagonal member wherein the diagonal member is fastened to the roof members to space the member formed as a geometric figure from the bird feeder a sufficient distance to permit birds access to the bird feeder from the top or side thereof.

5. The combination of a bird feeder and bird excluder in accordance with claim 1 in which said at least one thin elongated member extends outwardly from the access opening within a distance of three inches to two feet.

6. The combination of a bird feeder and bird excluder in accordance with claim 5 in which said geometric figure is a circle.

7. The combination of a bird feeder and a bird excluder in accordance with claim 5 in which said geometric figure is a square.

8. The combination of a bird feeder and bird excluder in accordance with claim 1 further including a plurality of thin elongated members extending from the bird feeder to the ground, wherein certain species of birds are prevented from feeding on the ground below the bird feeder.

9. A method of making a bird excluder for a bird feeder having at least one access opening; said access opening having a top and bottom and an access-opening height between the top and the bottom comprising the steps of:
    forming an elongated member shaped as the outline of a substantially-closed geometric figure dimensioned to extend upwardly within a range of distances extending from below the top of the access opening a distance of 10 percent of the access opening height to two feet above the top of the access opening and to extend outwardly a distance in the range of three inches to two feet from the access opening so as to be spaced to physically permit birds to enter and take food, wherein certain birds are selectively excluded and others permitted to enter from the top or sides.

10. A method in accordance with claim 9 further including the step of mounting the elongated member to the roof of the bird feeder and mounting the bird feeder to a support that holds it above the ground.

11. A method in accordance with claim 9 further including the step of stretching a plurality of elongated members from the bird feeder to the ground, wherein certain species of birds are caused to not feed under the bird feeder.

12. A method of selectively excluding birds from a bird feeder comprising the steps of:
    erecting a feeding compartment having at least one access opening; said access opening having a top and a bottom and an access-opening height between the top and the bottom for birds to obtain feed; and
    mounting a thin filament member shaped as a closed geometric figure to be within a distance extending from below the top of the access opening a distance of 10 percent of the access-opening height to two feet above the top of the access opening and spaced to permit birds to enter from the top and side, wherein House Sparrows (*Passer domesticus*) will not take food from the feeder but other species will take food from the feeder.

13. A method in accordance with claim 12 further including the step of mounting the bird feeder above ground.

14. A method in accordance with claim 12 further including a step of mounting a plurality of thin filament members between the bird feeder in a location adjacent to the ground, wherein certain species of birds are precluded from feeding on the ground under the bird feeder.

* * * * *